(12) United States Patent
Zhang et al.

(10) Patent No.: US 8,818,034 B2
(45) Date of Patent: Aug. 26, 2014

(54) FACE RECOGNITION APPARATUS AND METHODS

(75) Inventors: Tong Zhang, San Jose, CA (US); Wei Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 13/501,300

(22) PCT Filed: Nov. 30, 2009

(86) PCT No.: PCT/US2009/066053
§ 371 (c)(1),
(2), (4) Date: Apr. 11, 2012

(87) PCT Pub. No.: WO2011/065952
PCT Pub. Date: Jun. 3, 2011

(65) Prior Publication Data
US 2012/0230545 A1    Sep. 13, 2012

(51) Int. Cl.
*G06K 9/00*    (2006.01)
*G06K 9/62*    (2006.01)

(52) U.S. Cl.
CPC .......... *G06K 9/6253* (2013.01); *G06K 9/00221* (2013.01)
USPC ........... 382/103; 382/115; 382/117; 382/118; 340/5.52; 340/5.81

(58) Field of Classification Search
USPC ......... 382/103, 115, 117, 118, 128; 340/5.52, 340/5.81
See application file for complete search history.

(56) References Cited

U.S. PATENT DOCUMENTS

| | | | |
|---|---|---|---|
| 8,170,295 B2 * | 5/2012 | Fujii et al. | 382/117 |
| 8,170,297 B2 * | 5/2012 | Fujiwara et al. | 382/118 |
| 8,401,248 B1 * | 3/2013 | Moon et al. | 382/118 |

(Continued)

FOREIGN PATENT DOCUMENTS

| | | |
|---|---|---|
| JP | 07-306692 | 11/1995 |
| JP | 08-249453 | 9/1996 |
| JP | 2007080057 | 3/2007 |
| KR | 10-2008-0065532 | 7/2008 |

OTHER PUBLICATIONS

B. Yao, H. Ai and S. Lao, "Person-specific face recognition in unconstrained environments: a combination of offline and online learning."

(Continued)

*Primary Examiner* — Yosef Kassa

(57) ABSTRACT

One or more facial recognition categories are assigned to a face region detected in an input image (24). Each of the facial recognition categories is associated with a respective set of one or more different feature extraction modules (66) and a respective set of one or more different facial recognition matching modules (76). For each of the facial recognition categories assigned to the face region, the input image (24) is processed with each of the feature extraction modules (66) associated with the facial recognition category to produce a respective facial region descriptor vector of facial region descriptor values characterizing the face region. A recognition result (96) between the face region and a reference face image (28) is determined based on application of the one or more facial recognition matching modules (76) associated with the facial recognition categories assigned to the face region to the facial region descriptor vectors produced for the face region detected in the input image (24).

20 Claims, 3 Drawing Sheets

(56) References Cited

U.S. PATENT DOCUMENTS

| | | | |
|---|---|---|---|
| 8,401,252 B2* | 3/2013 | Schneiderman et al. | 382/118 |
| 8,462,998 B2* | 6/2013 | Sun et al. | 382/118 |
| 8,494,227 B2* | 7/2013 | Prokoski | 382/115 |
| 8,503,739 B2* | 8/2013 | Bourdev et al. | 382/118 |
| 8,582,892 B2* | 11/2013 | Lee et al. | 382/217 |
| 8,611,616 B1* | 12/2013 | Ross et al. | 382/118 |
| 8,639,689 B2* | 1/2014 | Datta et al. | 707/723 |

OTHER PUBLICATIONS

Eik Murphy-Chutorian et al., "Head Pose Estimation in Computer Vision: A Survey," IEEE Transactions on Pattern Analysis and Machine Intelligence, vol. 31, No. 4, Apr. 2009.

Hongjun Jia et al., "Support Vector Machines in Face Recognition with Occlusions," CVPR 2009, 136-141, (Jun. 2009).

J. Kittler, M. Hatef et al., "On combining classifiers," IEEE Trans. Pattern Analysis Machine Intelligence, 1998.

M. I, Jordan, R. A. Jacobs, "Hierearchial mixtures of experts and the EM algorithm," Neural Computation, 1994.

O. Toygar and A. Acan, "Multiple classifier implementation of a divide-and-conquer approach using appearance-based statistical methods for face recognition," Pattern Recognition Letters, 2004.

Paul Viola et al., "Rapid Object Detection Using a Boosted Cascade of Simple Features," CVPR 2001, vol. 1, pp. I-511-I-518 (2001).

R. A. Jacobs, M. I. Jordan, S. J. Nowlan, G. E. Hinton, "Adaptive mixtures of local experts," Neural Computation 1991.

T. G, Dietterich, "The dvide-and-conquer manifesto," 11th International Conference on Algorithmic Learning Theory, pp. 13-16, New York; Springer-Verlag, 2000.

T. K. Ho, J. Hull, S. Srihari, "Decision combination in multiple classifier systems," IEEE Trans. Pattern Analysis Machine Intelligence, 1994.

W. Zhao, R. Chellappa, A. Rosenfeld, P. J. Phillips, "Face recognition: a literature survey," ACM Computing Surveys, pp. 399-458, 2003.

Xiaoguang Lu et al., "Deformation Modeling for Robust 3D Face Matching," IEEE Transactions on Pattern Analysis and Machine Intelligence, vol. 30, No. 18, 1346-1356, Aug. 2008.

Y. Su, S. Shan, X. Chen and W. Gao, "Hierarchial ensemble of global and local classifier for face recognition," IEEE Conf. on Computer Vision, 2007.

Yiming Wu et al., "Face recognition Based on Discriminative Manifold Learning," ICPR'04, pp. 171-174 (2004).

Z. Li, D, Lin, H. Meng, X. Tang, "Discriminant mutual subspace learning for indoor and outdoor face recognition," IEEE Cont. Computer Vision Pattern Recognition 2007.

* cited by examiner

FACE RECOGNITION APPARATUS AND METHODS

BACKGROUND

Face recognition techniques oftentimes are used to locate, identify, or verify one or more persons appearing in images in an image collection. In a typical face recognition approach, faces are detected in the images; the detected faces are normalized; features are extracted from the normalized faces; and the identities of persons appearing in the images are identified or verified based on comparisons of the extracted features with features that were extracted from faces in one or more query images or reference images. Many automatic face recognition techniques can achieve modest recognition accuracy rates with respect to frontal images of faces that are accurately registered; however, when applied to other facial views (poses), poorly registered facial images, faces with large area of occlusion, poorly illuminated facial images or faces belonging to special population groups (e.g., babies and seniors), these techniques typically fail to achieve acceptable recognition accuracy rates.

What are needed are systems and methods that are capable of detecting and recognizing face images with wide variations in pose, illumination, expression, occlusion, aging, and population groups.

SUMMARY

In one aspect, the invention features a method in accordance with which a face region is detected in an input image. One or more facial recognition categories are assigned to the face region. Each of the facial recognition categories is associated with a respective set of one or more different feature extraction modules and a respective set of one or more different facial recognition matching modules. For each of the facial recognition categories assigned to the face region, the input image is processed with each of the feature extraction modules associated with the facial recognition category to produce a respective facial region descriptor vector of facial region descriptor values characterizing the face region. A recognition result between the face region and a reference face image is determined based on application of the one or more matching modules associated with the facial recognition categories assigned to the face region to the facial region descriptor vectors produced for the face region detected in the input image.

The invention also features apparatus operable to implement the method described above and computer-readable media storing computer-readable instructions causing a computer to implement the method described above.

DETAILED DESCRIPTION

Figure 1:
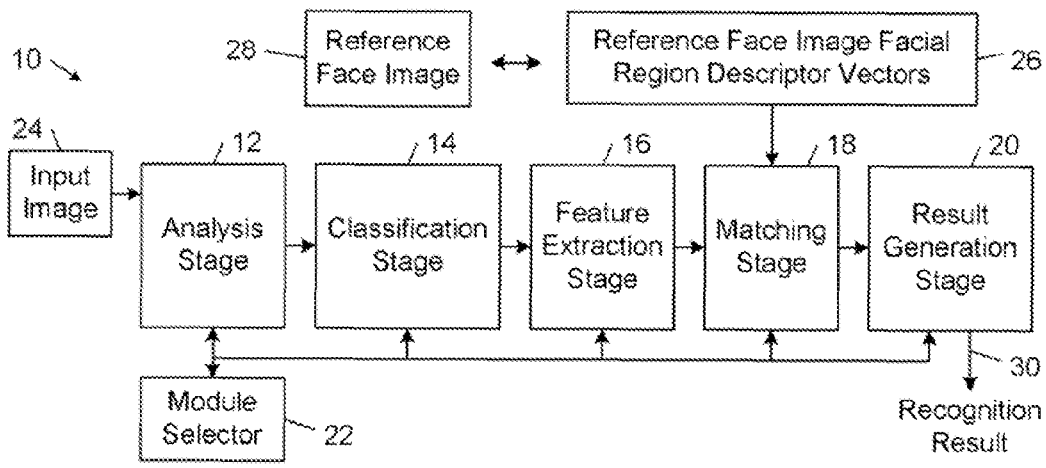
FIG. 1 is a block diagram of an embodiment of an image processing system.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

A "predicate" is a conditional part of a rule.

As used herein, the term "includes" means includes but not limited to, the term "including" means including but not limited to. The term "based on" means based at least in part on. The term "ones" means multiple members of a specified group.

II. Overview

The embodiments that are described herein provide systems and methods that are capable of detecting and recognizing face images with wide variations in pose, illumination, expression, occlusion, aging, and population groups. In accordance with these embodiments, a face image is classified into one or more facial recognition categories, the face image is processed separately through a respective category-specific facial recognition process for each facial recognition category into which it is classified. The results of the separate category-specific facial recognition processes can be combined to produce a final facial recognition result. The embodiments that are described herein are capable of performing face recognition in images captured in real world uncontrolled environments, images which typically are characterized by a wide diversity in presentation characteristics, such as pose, illumination, expression, aging, and occlusions.

The embodiments that are described herein apply a divide-and-conquer approach that divides the face recognition problem into a mainstream problem and several sub-problems (e.g., profile face recognition, occluded face recognition, ill-illuminated face recognition) whose solutions are combined to yield an optimal solution to each face matching case. The mainstream problem refers to the recognition of faces in conventional scenarios (e.g., frontal images that are accurately registered). The mainstream face recognition problem may be solved using any of a wide variety of known general automatic face recognition processes (see, e.g., W. Zhao, R. Chellappa, et al., "Face Recognition: A Literature Survey", ACM Computing Surveys, Vol. 25, No. 4, pp. 399-458, December 2003). In an exemplary appearance-based embodiment, Gabor filters in a Gabor filter module are applied to extract features from the face region and a Principal Component Analysis (PCA) and/or a Linear Discriminant Analysis (LDA) is performed to reduce the feature dimension and do the face matching. The sub-problems include specific problems that are solved by specifically-trained matching modules that are learned to produce much higher accuracy for these specialized cases than the known general automatic face recognition processes. The recognition results generated by these matching modules then can be combined to produce an improved recognition result.

FIG. 1 shows an embodiment of an image processing system 10 that includes an analysis stage 12, a classification stage 14, a feature extraction stage 16, a matching stage 18, a result generation stage 20, and a module selector 22. In operation, under the control of the module selector 22, an input image 24 is processed through the analysis stage 12, the classification stage 14, and the feature extraction stage 16 to detect a face region in the input image 24 and to produce a set of facial region descriptor vectors that characterize the face region. In the matching stage 18, the facial region descriptor vectors characterizing the face region in the input image 24 are compared with facial region descriptor vectors 26 that are associated with a reference face image 28 to produce one or more facial recognition category specific matching scores, which typically are combined in the result generation stage 20 to produce an output facial recognition result 30.

Figure 2:
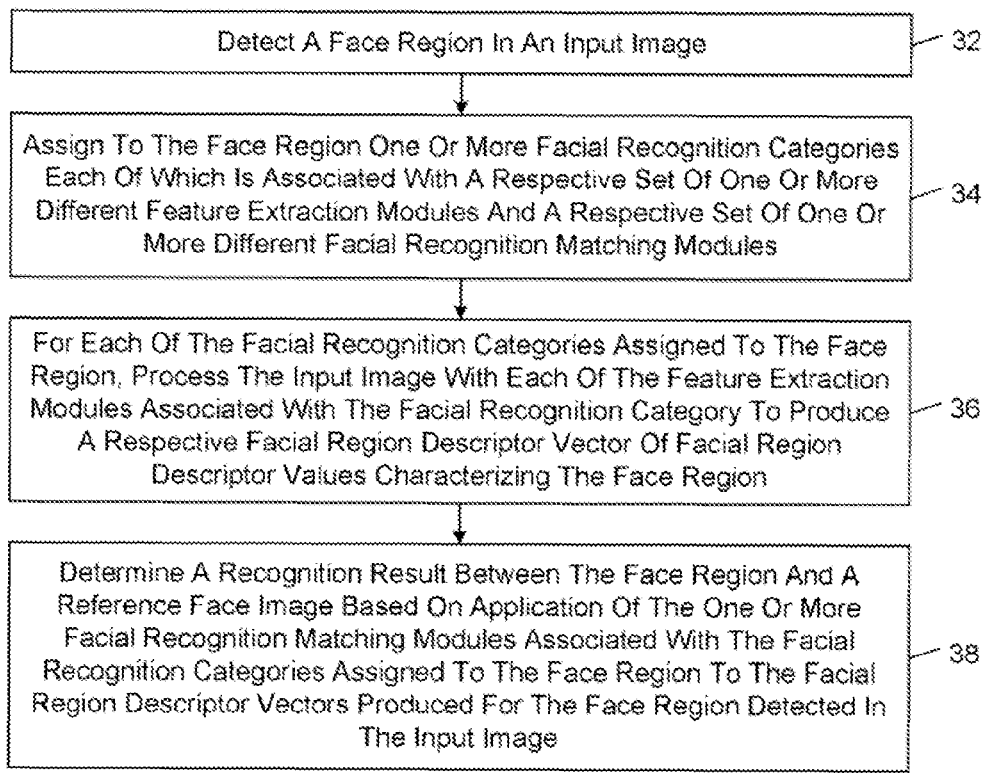
FIG. 2 is a flow diagram of an embodiment of a face recognition method.

FIG. 2 shows an embodiment of a method by which the image processing system 10 recognizes a face image in the input image 24. In accordance with this method, the analysis stage 12 detects a face region in the input image 24 (FIG. 2, block 32). The classification stage assigns to the face region one or more facial recognition categories each of which is associated with a respective set of one or more different feature extraction modules and a respective set of one or more different facial recognition matching modules (FIG. 2, block 34). For each of the facial recognition categories assigned to the face region, the feature extraction stage 16 processes the input image with each of the feature extraction modules associated with the facial recognition category to produce a respective facial region descriptor vector of facial region descriptor values characterizing the face region (FIG. 2, block 36). The result generation stage 20 determines the recognition result 30 between the face region detected in the input image 24 and the reference face image 28 based on application of the one or more facial recognition matching modules in the matching stage 18 that are associated with the facial recognition categories assigned to the face region to the facial region descriptor vectors produced for the face region detected in the input image 24 (FIG. 2, block 38).

Each of the analysis stage 12, the classification stage 14, the feature extraction stage 16, the matching stage 18, and the result generation stage 20 typically includes a respective set of processing modules. The module selector 22 selectively integrates the modules in each of the stages 12-20 into a face recognition processing pipeline that is determined to produce an optimal recognition result 30 for the characteristics of face region that is detected in the input image 24. A face region is allowed to belong to multiple facial recognition categories simultaneously. For example, an over-exposed profile face may belong to both the out-of-plane rotated face group and the ill-illuminated face group. The face recognition processing pipeline includes a respective processing path for each of the facial recognition categories that is assigned to the face region. In some embodiments, the module selector 22 is able to dynamically assemble a separate processing path for each of the following facial recognition categories: non-standard poses; poor illumination; special population groups (e.g., babies and seniors); facial images occluded by sunglasses; facial images containing particular facial expressions. The results of these separate processing paths are combined in the result generation stage 20 to produce the recognition result 30.

III. Exemplary Embodiment of the Image Processing System

A. Introduction

Figure 3:
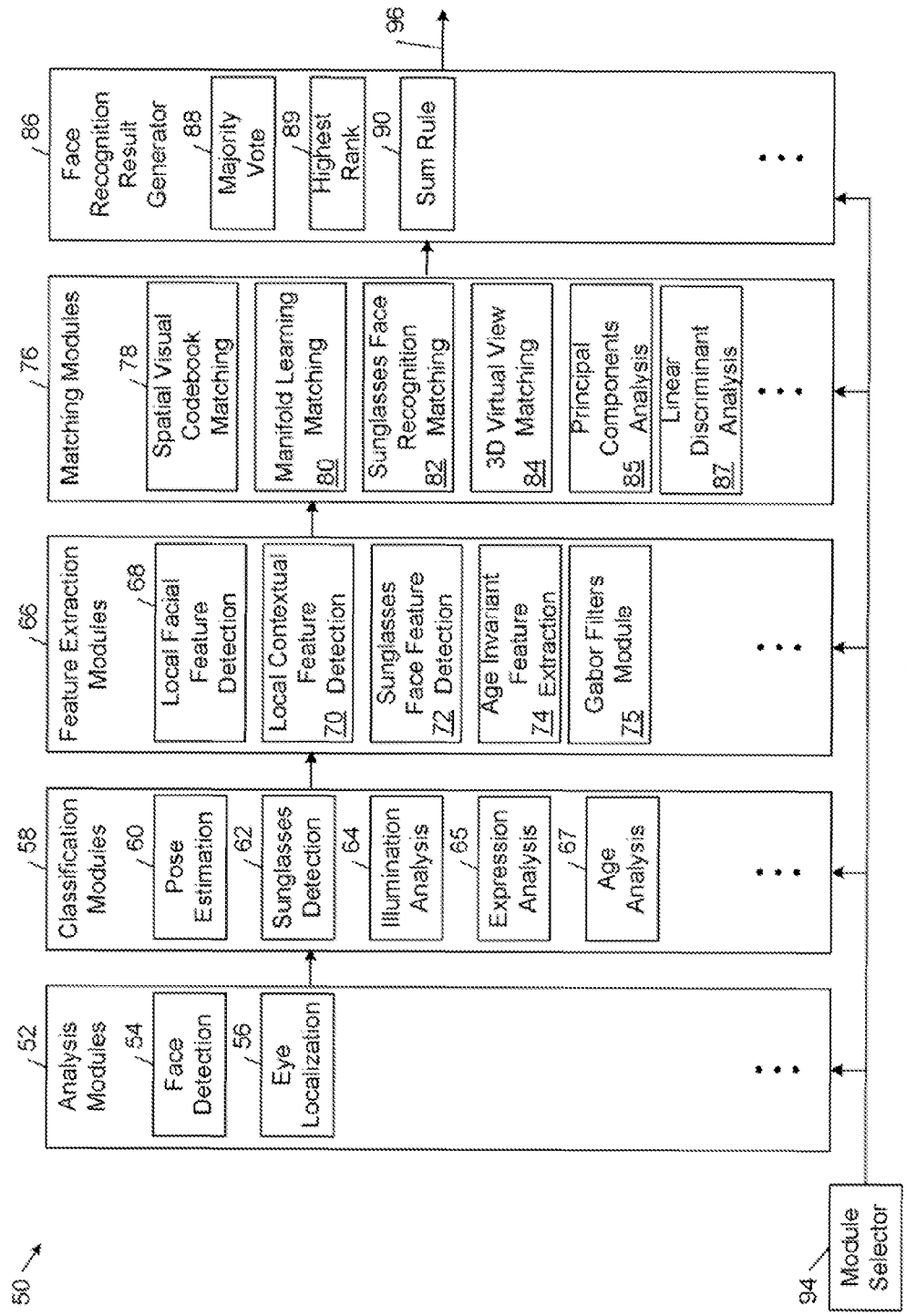
FIG. 3 is a block diagram of an embodiment of the image processing system of FIG. 1.

FIG. 3 shows an exemplary embodiment 50 of the image processing system 10. In this embodiment, the analysis stage 52 includes a set of analysis modules, including a face detection module 54 and an eye localization module 56. The classification stage 58 includes a set of classification modules, including a pose estimation module 60, a sunglasses detection module 62, an illumination analysis module 64, an expression analysis module 65, and an age analysis module 67. The feature extraction stage 66 includes a set of feature extraction modules, including a local facial feature detection module 68, a local contextual feature detection module 70, a sunglasses face feature detection module 72, an age-invariant feature extraction module 74, and a Gabor filter module 75. The matching stage 76 includes a set of matching modules, including a spatial visual codebook matching module 78, a manifold learning matching module 80, a sunglasses face recognition matching module 82, a three-dimensional (3D) virtual view matching module 84, a principal components analysis module 85, and a linear discriminant analysis module 87. The face recognition result generator stage 86 includes a set of face recognition result generation modules, including a majority vote module 88, a highest rank module 89, and a sum rule module 90.

The image processing system 50 includes a module selector 94 that selectively integrates the modules in each of the stages 52, 58, 66, 76, 86 into a face recognition processing pipeline that is determined to produce an optimal recognition result 96 for the characteristics of the face region that is detected in the input image 24.

B. Analysis Modules

The analysis stage 52 includes a set of analysis modules, including a face detection module 54 and an eye localization module 56

In some embodiments, the analysis stage 52 includes a face detection module 54 that provides a preliminary estimate of the location, size, and pose of the faces appearing in the input image 24. Optionally, a confidence score also is output for each detected face. In general, the face detection module 54 may use any type of face detection process that determines the presence and location of each face in the input image 24. Exemplary face detection methods include but are not limited to feature-based face detection methods, template-matching face detection methods, neural-network-based face detection methods, and image-based face detection methods that train machine systems on a collection of labeled face samples. An exemplary feature-based face detection approach is described in Viola and Jones, "Robust Real-Time Object Detection," Second International Workshop of Statistical and Computation Theories of Vision—Modeling, Learning, Computing, and Sampling, Vancouver, Canada (Jul. 13, 2001). An exemplary neural-network-based face detection method is described in Rowley et al., "Neural Network-Based Face Detection," IEEE Transactions on Pattern Analysis and Machine Intelligence, Vol. 20, No. 1 (January 1998). In some embodiments, the face detection module 54 outputs one or more face region parameter values, including the locations of the face areas, the sizes (i.e., the dimensions) of the face areas, and the rough poses (orientations) of the face areas. In some of these embodiments, the face areas are demarcated by respective rectangle boundaries that define the locations, sizes, and poses of the face areas appearing in the input image 24.

In some embodiments, the analysis stage 52 includes an eye localization module 56 that provides an estimate of the locations of one or both eyes in a detected face region. The output of this module is a set of eye location pairs, where each pair indicates the locations of two eyes of one person. Optionally, a confidence score is output for each pair of detected eye locations, which is derived from the likelihood value in the eye detection process. In general, the eye localization module 56 may use any type of eye localization process that determines the presence and location of each eye in the detected face region. Exemplary eye localization methods include feature-base eye localization methods that locate eyes based on one or more features (e.g., gradients, projections, templates, wavelets, and radial symmetry transform), and feature maps determined from color characteristics of the input image. In some eye localization methods, color cues or eye-pair characteristics are used to improve eye localization and reduce false alarms in the results of a feature-based eye localization method. In one exemplary embodiment, the eye localization module 56 determines a skin map of the face region, detects two non-skin areas that are located in the top portion (e.g., top one third) of the face region, and selects the centroids of the two non-skin areas as the locations of the eyes. ° In some embodiments, the confidence level of the eye locations depends on the sizes of the detected non-skin areas, where smaller sizes are associated with lower confidence values.

C. Classification Modules

The classification stage 58 includes a set of classification modules, including a pose estimation module 60, a sunglasses detection module 62, an illumination analysis module 64, an expression analysis module 65, and an age analysis module 67. The classification modules typically are implemented by pre-built classifiers. The module selector 94 assigns the face region detected in the input image 24 to one or more facial recognition categories based on a probabilistic function of the outputs of the classification modules, wherein the probabilistic function typically is determined by training the module selector 94 on training image data. Face regions that are not assigned to the special groups identified by the classification modules of the classification stage 58 remain in the mainstream group (e.g., face regions that correspond to face images that were taken in controlled environments with constrained lighting, pose, and expression).

The pose estimation module 60 provides an estimate of the pose of the detected face region. In some embodiments, the pose estimation module 60 identifies out-of-plane rotated faces by detecting faces that are oriented in a profile pose by more than a certain degree, and identifies faces that are tilted up or down more than a certain degree. Any of the pose estimation methods known in the art may be used by the pose estimation module 60 (see, e.g., Murphy-Chutorian, E.; Trivedi, M. M.; "Head Pose Estimation in Computer Vision: A Survey" IEEE Transactions on Pattern Analysis and Machine Intelligence Volume 31, Issue 4, April 2009 Page(s): 607-626). In some embodiments, the pose of the detected face region is determined based on the locations of features (or landmarks) in the detected face region, such as the eyes and the mouth. In embodiments in which the face areas are demarcated by respective elliptical boundaries, the poses of the face areas are given by the orientations of the major and minor axes of the ellipses, which are usually obtained by locally refining the circular or rectangular face areas originally detected by the face detection module 54.

The sunglasses detection module 62 determines the presence and location of sunglasses in the detected face region. In general, the sunglasses detection module 62 may detect the presence and location of sunglasses in a variety of different ways. For example, sunglasses may be detected in the face region based on eye detection, face alignment and/or a trained Adaboost detector. In one exemplary embodiment, the sunglasses detection module 62 determines a skin map of the face region, detects two non-skin areas that are located in the top portion (e.g., top one third) of the face region, and determines that sunglasses are present if the sizes of the non-skin areas exceed an empirically determined threshold value. In some embodiments, the confidence level associated with the detection of sunglasses depends on the sizes of the detected non-skin areas, where larger sizes are associated with lower confidence values. In some embodiments, the module selector 94 employs the sunglasses detection module 62 to detect sunglasses in the face region only in response to a determination that the one or more eye location confidence scores satisfy a specified predicate (e.g., the confidence scores for both eye locations are below an empirically determined threshold). In response to a detection of sunglasses in the face region, the module selector 94 classifies the face region into the sunglasses-based facial recognition category.

The illumination analysis module 64 identifies face regions that are ill-illuminated (e.g., with over exposure or unbalanced exposure). In general, the illumination analysis module 64 may identify ill-illuminated face regions in a variety of different ways. In one exemplary embodiment, the illumination analysis module 64 determines whether a face region is over-exposed or has an unbalanced exposure based on counts of the number of over-exposed and under-exposed pixels within the face region. In this process, the illumination analysis module 64 labels pixels within a face region as over-exposed if (i) the luminance values of more than half the pixels within a window centered about the pixel exceed a first threshold value (e.g., 249) or (ii) the ratio of the energy of the luminance gradient and the luminance variance exceeds a second threshold value (e.g., 900) within the window and the mean luminance within the window exceeds a third threshold (e.g., 239). The illumination analysis module 64 labels pixels within the face region as under-exposed if (i) the luminance values of more than half the pixels within the window are below a fourth threshold (e.g., 6) or (ii) the ratio of the energy of the luminance gradient and the luminance variance within the window exceeds the second threshold and the mean luminance within the window is below a fifth threshold (e.g., 30). For face regions that are classified into the ill-exposure group, illumination normalization typically is applied to the face regions before facial region descriptor vectors are extracted by the modules of the feature extraction stage 66.

The expression analysis module 65 detects expressions such as laughing and crying based on facial feature alignment result. Based on the results of the expression analysis, the module selector 94 determines whether or not the face region should be classified into the expression based facial recognition category. If the face region is assigned to the expression based facial recognition category, the module selector 94 processes the face region through the local facial feature detection module 68 in the feature extraction stage 66 and the manifold learning matching module 80 in the matching stage 76.

The age analysis module 67 determines whether or not the face region should be assigned to a special age category (e.g., babies or seniors) or to an aging based facial recognition category (e.g., for the case when matching a person's recent photo with a photo of the same person 20 years ago). For special population groups categories (e.g., babies and seniors), trained classifiers are used to find features that are most discriminative for that particular age groups, and these features are used for recognizing face regions in this category.

For the aging based facial recognition category, time stamps of the images (i.e., the input image 24 and the reference image), as well as demographic estimation results of the faces (i.e., the detected face region and the reference face image 28) such as age and gender are used to estimate whether the face matching case falls into this category (e.g., a face of a teenage male in an image taken 15 years ago matching with a face of an adult male in an image taken recently). The age-invariant feature extraction module 74, which is specially trained for the aging based facial recognition category (using training data belonging to this category), is applied to the face region and the reference face image 28 to extract age-invariant features (i.e., facial features that are invariant over time), which are used in the matching stage 76.

D. Feature Extraction Modules

The feature extraction stage 66 includes a set of feature extraction modules, including a local facial feature detection module 68, a local contextual feature detection module 70, a sunglasses face feature detection module 72, an age-invariant feature extraction module 74, and a Gabor filters module 75.

The local facial feature detection module 68 extracts features from the detected face region to produce a respective facial region descriptor vector of local facial descriptor values characterizing the face region. In this process, the local facial feature detection module 68 applies interest region detectors to the detected face region in order to detect interest regions in the face region and, for each of the detected interest regions, the local facial feature detection module 68 applies facial region descriptors to the detected interest region in order to determine a respective facial region descriptor vector $\nabla_R = (d_1, \ldots d_n)$ of facial region descriptor values characterizing the detected interest region. In general, any of a wide variety of different interest region detectors may be used to detect interest regions in the face region. In some embodiments, the interest region detectors are affine-invariant interest region detectors (e.g., Harris corner detectors, Hessian blob detectors, principal curvature based region detectors, and salient region detectors). In addition, any of a wide variety of different local descriptors may be used to extract the facial region descriptor values, including distribution based descriptors, spatial-frequency based descriptors, differential descriptors, and generalized moment invariants. In some embodiments, the local descriptors include a scale invariant feature transform (SIFT) descriptor and one or more textural descriptors (e.g., a local binary pattern (LBP) feature descriptor, and a Gabor feature descriptor).

The local contextual feature detection module 70 extracts features from the input image 24 to produce a respective contextual region descriptor vector of local facial descriptor values characterizing contextual regions, such as eyebrows, ears, forehead, chin, and neck, which do not tend to change much over time and different occasions. In this process, the local contextual feature detection module 70 applies interest region detectors to the input image 24 in order to detect interest regions in the training images 18. In general, any of a wide variety of different interest region detectors may be used to detect interest regions in the input image 24. In some embodiments, the interest region detectors are affine-invariant interest region detectors (e.g., Harris corner detectors, Hessian blob detectors, principal curvature based region detectors, and salient region detectors). For each of the detected interest regions, the local contextual feature detection module 70 applies the auxiliary (or contextual) region descriptors to each of the detected interest region in order to determine a respective auxiliary region descriptor vector $\nabla_{AR} = (c_1, \ldots, c_n)$ of auxiliary region descriptor values characterizing the detected interest region. In general, any of a wide variety of different local descriptors may be used to extract the facial region descriptor values and the auxiliary region descriptor values, including distribution based descriptors, spatial-frequency based descriptors, differential descriptors, and generalized moment invariants. In some embodiments, the auxiliary descriptors include a scale invariant feature transform (SIFT) descriptor and one or more textural descriptors (e.g., a local binary pattern (LBP) feature descriptor, and a Gabor feature descriptor). The auxiliary descriptors also typically include shape-based descriptors. An exemplary type of shape-based descriptor is a shape context descriptor that describes a distribution over relative positions of the coordinates on an auxiliary region shape using a coarse histogram of the coordinates of the points on the shape relative to a given point on the shape. Addition details of the shape context descriptor are described in Belongie, S., Malik, J. and Puzicha, J., "Shape matching and object recognition using shape contexts," In *IEEE Transactions on Pattern Analysis and Machine Intelligence*, volume 24(4), pages 509-522 (2002).

The sunglasses face feature detection module 72 extracts features from the detected face region to produce a respective facial region descriptor vector of general or local facial descriptor values characterizing the face region. In some embodiments, the sunglasses face feature detection module 72 operates in essentially the same way as the local facial feature detection module 68, except that the areas of the face region corresponding to the detected sunglasses are excluded.

The age-invariant feature extraction module 74 extracts features from the detected face region to produce a respective facial region descriptor vector of age-invariant facial descriptor values characterizing the face region. For face matching cases belonging to the aging category (e.g. the two faces being matched are from images that were taken with a lapse of more than 10 years), a special aging-specific classification module is trained to identify features that are invariant to aging effects based on training samples that belong to the aging category. In this process, the aging-specific classification module typically identifies the descriptor dimensions in the facial region descriptor vectors that are invariant with aging.

The Gabor filters module 75 includes one or more Gabor feature descriptors that are used to extract general and local textural features at different scales and orientations from face regions assigned to the mainstream (default) category.

E. Matching Modules

The matching stage 76 includes a set of matching modules, including a spatial visual codebook matching module 78, a manifold learning matching module 80, a sunglasses face recognition matching module 82, a three-dimensional (3D) virtual view matching module 84, a principal components analysis module 85, and a linear discriminant analysis module 87. Each of the matching modules corresponds to a pre-built face recognition engine that is specially-designed to handle a specific one of the facial recognition categories. For each of the facial recognition categories assigned to the detected face region, the associated set of one or more facial recognition matching modules is applied to (i) the facial region descriptor vectors produced from the input image 24 for the facial recognition category and (ii) corresponding facial region descriptor vectors produced from the reference face image 28 to generate a respective matching-module-specific matching score.

The spatial visual codebook matching module 78 may be implemented in a variety of different ways. In one exemplary embodiment, the spatial visual codebook matching module 78 implements one or more of the spatial visual codebook based face region matching processes described in PCT/US09/58476, which was filed on Sep. 25, 2009, and is incorporated herein by reference. In these processes, the spatial visual codebook matching module 78 builds a visual codebook of interest regions, and performs spatial pyramid matching on the visual codebook representation of the facial region descriptor vectors.

The manifold learning matching module 80 may be implemented in a variety of different ways known in the art (see, e.g., G. Shakhnarovich and B. Moghaddam, "Face Recognition in Subspaces", Handbook of Face Recognition, Eds. Stan Z. Li & Anil K. Jain, Springer-Verlag, 2004). For example, for an input face image, feature detectors are applied to locate features, then descriptors are extracted for each feature. These descriptors are embedded in the manifold, and the geometric relation among features is extracted as a graph. The graph is then matched with the database containing local feature manifold graphs to do the recognition.

The sunglasses face recognition matching module 82 may be implemented in a variety of ways. For the sunglasses facial recognition category, the faces are rectified based on the position of the occluded region, and features are taken from areas of the face region that are not occluded. The sunglasses face recognition module 82 is trained on the new feature set. In some embodiments, the sunglasses face recognition matching module 82 implements the matching process that is used by the spatial visual codebook matching module 78; the sunglasses face recognition matching module 82 applies this process to the features that are extracted by the sunglasses face feature detection module 72. In other embodiments, the sunglasses face recognition matching module 82 applies the matching process used by the manifold learning matching module 80 to the features extracted by the sunglasses face feature detection module 72. In one exemplary embodiment, the sunglasses face recognition matching module 82 applies a support vector machine based matching process to the features extracted by the sunglasses face feature detection module 72 (see, e.g., Hongjun Jia and Aleix M. Martinez, "Support Vector Machines in Face Recognition with Occlusions," CVPR 2009).

The three-dimensional virtual view matching module 84 may be implemented in a variety of different ways known in the art. For the out-of-plane rotated facial recognition category, a pre-trained 3D face model is used to generate virtual views of the reference face image 28 (i.e., views of the face at different out-of-plane rotation angles, including up, down, left, right). Based on the pose estimation result, the face region detected in the input image 24 will be matched with the proper virtual views of the reference face image 28 to produce the face recognition result. In one exemplary embodiment, the three-dimensional virtual view matching module 84 implements the virtual view matching process described in Xiaoguang Lu et al., "Deformation Modeling for Robust 3D Face Matching," PAMI 2008. In some embodiments, in response to a determination that an estimated pose of the detected face region is different from an estimated pose of the reference face image 28, the three-dimensional virtual view matching module 84 generates a matching-module-specific matching score based on a warping of the facial region descriptor vectors respectively produced for at least one of the detected face region and the reference face image to a common pose orientation in accordance with a three-dimensional virtual view facial recognition matching module process.

In some embodiments, one or both of the principal components analysis module 85 and the linear discriminant analysis module 87 are applied to the textural features extracted by the Gabor filters module 75 to derive a reduced feature space based on which matching results are produced for face regions assigned to the mainstream (default) category (see, e.g., W. Zhao, R. Chellappa, et al., "Face Recognition: A Literature Survey", ACM Computing Surveys, Vol. 25, No. 4, pp. 399-458, December 2003).

F. Recognition Results Generation Modules

The face recognition results for the mainstream group and for all the special groups are integrated together in the face recognition result generator stage 86. The face recognition result generator stage 86 includes a set of face recognition result generation modules, including a majority vote module 88, a highest rank module 89, and a sum rule module 90. The recognition results of the matching modules are combined based on a differentiable function of their outputs. The face recognition result generator stage 86 generates seamless results for all kinds of variations in face recognition. In some embodiments, the outputs of the matching modules are combined at the abstract level by the majority vote module 88. In some embodiments, the outputs of the conquerors are combined at the rank level by the highest rank module 89 (see, e.g., Li, D et al., "Discriminant mutual subspace learning for indoor and outdoor face recognition," *IEEE Conf. Computer Vision Pattern Recognition* 2007). In some embodiments, the outputs of the matching modules are combined at the measurement level by the sum rule module 90 (see, e.g., J. Kittler, M. Hatef et al., "On combining classifiers," *IEEE Trans. Pattern Analysis Machine Intelligence,* 1998). In some embodiments, the results of each of the face recognition result generation modules 88, 89, and 90 are combined by the recognition result generator stage 86 to produce the recognition result 96. In these embodiments, the recognition result generator stage 86 is trained in accordance with a supervised learning process that optimizes the recognition accuracy.

G. Module Selector

The module selector 94 implements a divide-and-conquer framework in modular way. Instead of having totally separate processes for different facial recognition categories, modules are shared among the different facial recognition categories. The selector module 94 is trained on real-world face recognition dataset in order to have the intelligence of adopting the right modules to make one or more optimal paths for each individual case of face matching. For example, different paths might be taken for matching face A with face B, vs. matching face A with face C, although some modules might be shared. The optimization in module integration enables the image processing system 50 to achieve maximal accuracy and efficiency.

The module selector comprises a set of path selection rules that are initialized by human input and then optimized by learning on training images with the objective of maximal recognition accuracy and efficiency. These rules determine the processing path for each facial recognition category. These rules are organized in a predesigned structure, such as a decision tree. A large amount of real-world face matching cases typically are used to train the module selector 94 to derive the rules, so that at each rule, it knows for an input, what the optimal output should be.

IV. Exemplary Operating Environment

Each of the input image 24 and the reference face image 28 (see FIG. 1) may correspond to any type of image, including an original image (e.g., a video keyframe, a still image, or a scanned image) that was captured by an image sensor (e.g., a digital video camera, a digital still image camera, or an optical scanner) or a processed (e.g., sub-sampled, filtered, reformatted, enhanced or otherwise modified) version of such an original image.

Embodiments of the image processing system 10 (including image processing system 50) may be implemented by one or more discrete modules (or data processing components) that are not limited to any particular hardware, firmware, or software configuration. In the illustrated embodiments, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

The modules of the image processing system 10 may be co-located on a single apparatus or they may be distributed across multiple apparatus; if distributed across multiple apparatus, these modules may communicate with each other over local wired or wireless connections, or they may communicate over global network connections (e.g., communications over the Internet).

In some implementations, process instructions (e.g., machine-readable code, such as computer software) for implementing the methods that are executed by the embodiments of the image processing system 10, as well as the data they generate, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image processing system 10 may be implemented in any one of a wide variety of electronic devices, including desktop computers, workstation computers, and server computers.

Figure 4:
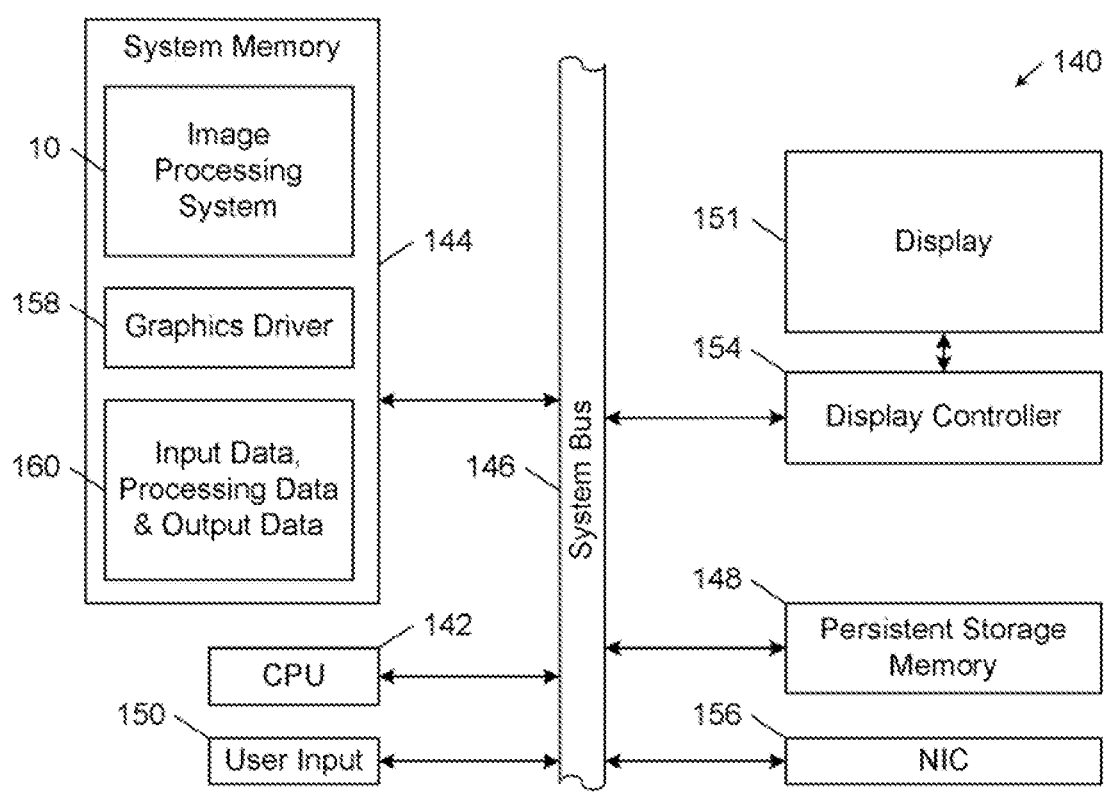
FIG. 4 is a block diagram of an embodiment of a computer system.

FIG. 4 shows an embodiment of a computer system 140 that can implement any of the embodiments of the image processing system 10 (including image processing system 50) that are described herein. The computer system 140 includes a processing unit 142 (CPU), a system memory 144, and a system bus 146 that couples processing unit 142 to the various components of the computer system 140. The processing unit 142 typically includes one or more processors, each of which may be in the form of any one of various commercially available processors. The system memory 144 typically includes a read only memory (ROM) that stores a basic input/output system (BIOS) that contains start-up routines for the computer system 140 and a random access memory (RAM). The system bus 146 may be a memory bus, a peripheral bus or a local bus, and may be compatible with any of a variety of bus protocols, including PCI, VESA, Microchannel, ISA, and EISA. The computer system 140 also includes a persistent storage memory 148 (e.g., a hard drive, a floppy drive, a CD ROM drive, magnetic tape drives, flash memory devices, and digital video disks) that is connected to the system bus 146 and contains one or more computer-readable media disks that provide non-volatile or persistent storage for data, data structures and computer-executable instructions.

A user may interact (e.g., enter commands or data) with the computer 140 using one or more input devices 150 (e.g., a keyboard, a computer mouse, a microphone, joystick, and touch pad). Information may be presented through a user interface that is displayed to a user on the display 151 (implemented by, e.g., a display monitor), which is controlled by a display controller 154 (implemented by, e.g., a video graphics card). The computer system 140 also typically includes peripheral output devices, such as speakers and a printer. One or more remote computers may be connected to the computer system 140 through a network interface card (NIC) 156.

As shown in FIG. 4, the system memory 144 also stores the image processing system 10, a graphics driver 158, and processing information 160 that includes input data, processing data, and output data. In some embodiments, the image processing system 10 interfaces with the graphics driver 158 (e.g., via a DirectX® component of a Microsoft Windows® operating system) to present a user interface on the display 151 for managing and controlling the operation of the image processing system 10.

V. Conclusion

The embodiments that are described herein provide systems and methods that are capable of detecting and recognizing face images with wide variations in pose, illumination, expression, occlusion, aging, and population groups. In accordance with these embodiments, a face image is classified into one or more facial recognition categories, the face image is processed separately through a respective category-specific facial recognition process for each facial recognition category into which it is classified. The results of the separate category-specific facial recognition processes can be combined to produce a final facial recognition result. The embodiments that are described herein are capable of performing face recognition in images captured in real world uncontrolled environments, images which typically are characterized by a wide diversity in presentation characteristics, such as pose, illumination, expression, aging, and occlusions.

Other embodiments are within the scope of the claims.

The invention claimed is:

1. A method, comprising:
  detecting a face region in an input image;
  assigning to the face region one or more facial recognition categories each of which is associated with a respective set of one or more different feature extraction modules and a respective set of one or more different facial recognition matching modules;
  for each of the facial recognition categories assigned to the face region, processing the input image with each of the feature extraction modules associated with the facial recognition category to produce a respective facial region descriptor vector of facial region descriptor values characterizing the face region; and
  determining a recognition result between the face region and a reference face image based on application of the facial recognition matching modules associated with the facial recognition categories assigned to the face region to the facial region descriptor vectors produced for the face region detected in the input image;
  wherein the detecting, the assigning, the processing, and the determining are performed by a computer.

2. The method of claim 1, further comprising ascertaining one or more facial landmarks in the face region, wherein the assigning comprises classifying the face region into at least one of the one or more facial recognition categories based on the one or more detected facial landmarks.

3. The method of claim 2, wherein the classifying comprises estimating a pose of the face region based on the one or more ascertained facial landmarks, and classifying the face region into a respective one of the facial recognition categories based on the estimated pose of the face region.

4. The method of claim 2, wherein the ascertaining comprises determining a respective location of one or more eyes in the face region and a respective eye location confidence score associated with each of the one or more determined eye locations.

5. The method of claim 4, wherein:
in response to a determination that the one or more eye location confidence scores satisfy a specified predicate, the assigning comprises detecting sunglasses in the face region; and
in response to a detection of sunglasses in the face region, the assigning comprises classifying the face region into a sunglasses-based facial recognition category.

6. The method of claim 5, wherein the processing comprises excluding one or more regions associated with detected sunglasses in the face region from the processing of the input image with each of the feature extraction modules associated with the sunglasses-based facial recognition category.

7. The method of claim 1, wherein the determining comprises for each of the facial recognition categories assigned to the face region, applying the associated set of one or more facial recognition matching modules to the facial region descriptor vectors produced from the input image for the facial recognition category and corresponding facial region descriptor vectors produced from the reference face image to generate a respective matching-module-specific matching score.

8. The method of claim 7, wherein, in response to a determination that an estimated pose of the face region is different from an estimated pose of the reference face image, the applying comprises generating a matching-module-specific matching score based on a warping of the facial region descriptor vectors respectively produced for at least one of the input image and the reference face image to a common pose orientation in accordance with a three-dimensional virtual view facial recognition matching module process.

9. The method of claim 7, wherein the applying comprises for each of the facial recognition categories, selecting a different respective set of one or more facial recognition matching modules from a set comprising: a spatial visual codebook based facial recognition matching module; a manifold learning based facial recognition matching module; a sunglasses based facial recognition matching module; and a three-dimensional virtual view based facial recognition matching module.

10. The method of claim 7, wherein the determining comprises, in response to the generation of multiple matching-module-specific matching scores, determining an output matching score based on a combination of the matching-module-specific matching scores.

11. The method of claim 1, wherein the assigning comprises selecting the one or more facial recognition categories assigned to the face region from a set comprising: a pose based facial recognition category; a sunglasses based facial recognition category; an illumination based facial recognition category; an expression based facial recognition category; and an aging based facial recognition category.

12. The method of claim 1, wherein the determining comprises determining an output matching score indicating a degree of match between the face region and a reference face image.

13. Apparatus, comprising:
a computer-readable medium storing computer-readable instructions; and
a data processor coupled to the computer-readable medium, operable to execute the instructions, and based at least in part on the execution of the instructions operable to perform operations comprising
detecting a face region in an input image;
assigning to the face region one or more facial recognition categories each of which is associated with a respective set of one or more different feature extraction modules and a respective set of one or more different facial recognition matching modules;
for each of the facial recognition categories assigned to the face region, processing the input image with each of the feature extraction modules associated with the facial recognition category to produce a respective facial region descriptor vector of facial region descriptor values characterizing the face region; and
determining a recognition result between the face region and a reference face image based on application of the facial recognition matching modules associated with the facial recognition categories assigned to the face region to the facial region descriptor vectors produced for the face region detected in the input image.

14. The apparatus of claim 13, wherein based at least in part on the execution of the instructions the data processor is operable to perform operations comprising ascertaining one or more facial landmarks in the face region, wherein in the assigning the data processor is operable to perform operations comprising classifying the face region into at least one of the one or more facial recognition categories based on the one or more detected facial landmarks.

15. The apparatus of claim 13, wherein based at least in part on the execution of the instructions the data processor is operable to perform operations comprising determining a respective location of one or more eyes in the face region and a respective eye location confidence score associated with each of the one or more determined eye locations; and
wherein: in response to a determination that the one or more eye location confidence scores satisfy a specified predicate, the data processor performs operations comprising detecting sunglasses in the face region; and in response to a detection of sunglasses in the face region, the data processor performs operations comprising classifying the face region into a sunglasses-based facial recognition category.

16. The apparatus of claim 13, wherein in the determining the data processor is operable to perform operations comprising, for each of the facial recognition categories assigned to the face region, applying the associated set of one or more facial recognition matching modules to the facial region descriptor vectors produced from the input image for the facial recognition category and corresponding facial region descriptor vectors produced from the reference face image to generate a respective matching-module-specific matching score.

17. At least one computer-readable medium having computer-readable program code embodied therein, the computer-readable program code adapted to be executed by a computer to implement a method comprising:
detecting a face region in an input image;
assigning to the face region one or more facial recognition categories each of which is associated with a respective set of one or more different feature extraction modules and a respective set of one or more different facial recognition matching modules;
for each of the facial recognition categories assigned to the face region, processing the input image with each of the feature extraction modules associated with the facial recognition category to produce a respective facial region descriptor vector of facial region descriptor values characterizing the face region; and determining a recognition result between the face region and a reference face image based on application of the facial recognition matching modules associated with the facial recognition categories assigned to the face region to the facial region descriptor vectors produced for the face region detected in the input image.

18. The at least one computer-readable medium of claim 17, wherein the method further comprises ascertaining one or more facial landmarks in the face region, wherein the assigning comprises classifying the face region into at least one of the one or more facial recognition categories based on the one or more detected facial landmarks.

19. The at least one computer-readable medium of claim 17, wherein the method further comprises determining a respective location of one or more eyes in the face region and a respective eye location confidence score associated with each of the one or more determined eye locations; and wherein:
in response to a determination that the one or more eye location confidence scores satisfy a specified predicate, the assigning comprises detecting sunglasses in the face region; and in response to a detection of sunglasses in the face region, the assigning comprises classifying the face region into a sunglasses-based facial recognition category.

20. The at least one computer-readable medium of claim 17, wherein the determining comprises for each of the facial recognition categories assigned to the face region, applying the associated set of one or more facial recognition matching modules to the facial region descriptor vectors produced from the input image for the facial recognition category and corresponding facial region descriptor vectors produced from the reference face image to generate a respective matching-module-specific matching score.

* * * * *